Patented Aug. 28, 1945

2,383,907

UNITED STATES PATENT OFFICE 2,383,907

PROCESS OF DESTROYING BACTERIA

Henry A. Beechem and Frederick W. Fabian, East Lansing, Mich., assignors to P. W. Bonewitz Co., Burlington, Iowa No Drawing. Application June 28, 1943,
Serial No. 492,600

6 Claims. (Cl. 99—156)

This invention relates to a method of freeing certain food products such as vegetables, spices, legumes, cereal grains and meats of sporogenic bacteria which are characterized by their ability to produce spores. Representative of the specific foods which are markedly improved by this invention are vegetables such as sugar beets, red beets, carrots, potatoes, peanuts, cabbage, sweet potatoes, yams and asparagus, cereals such as soy beans, pea beans, peas, wheat, barley, rye and corn, spices such as allspice, bay leaves, pepper, dill, celery, cloves and caraway, and as stated, meats such as beef and lamb and including fish, shrimp and other sea foods of that same type.

Sporogenic bacteria are especially detrimental in flours such as wheat and soy and others including sugar and spices which are used for food purposes because of the particular characteristics of these bacteria. Such bacteria are unique among bacteria in being very resistant to heat treatment. They will normally withstand, without harm, being treated for six hours at boiling temperature (212° F.). Some less common sporogenic bacteria are known to withstand boiling temperature for eighteen hours.

Another characteristic or property of some types of these bacteria, namely, thermophilic are that they are heat lovers. They will best grow at a temperature of 131° F. This property of thermophilic bacteria causes the canner much trouble because it requires immediate cooling of processed canned products. The normal time allowed in practice to process food products does not destroy all thermophilic bacteria. The canner hopes by this process of heat treatment under pressure to kill only the greater population of thermophilic bacteria. To accomplish total destruction of these bacteria by known procedures would normally require so much time as to be injurious to the quality of the food product.

There are three distinct types of thermophilic bacteria—two of these types produce gas in their process of decomposing food products while the third variety produces no gas but destroys the food product and produces acid only. The gas producing types are:

Thermophilic bacteria producing hydrogen sulphide. These are the most common and are very troublesome and disagreeable when present. Example is *Clostridium nigrificans*.

Thermophilic bacteria not producing hydrogen sulphide. These are the next most common group. Example is *Clostridium thermosaccharolyticum*.

They are very harmful to food and are capable of rendering it useless for edible purposes, but because of their facility to produce gas, the sealed container can be detected by its swelled and bulging appearance. Such distorted containers can be easily picked out and destroyed before shipment is made to the consumer. Loss of the product, in this case, is the only loss.

The foregoing is not true about the third type of thermophilic bacteria already referred to which produces no gas and are generally known as the "flat sour" bacteria. They are by far the most common cause of spoilage. Example is *Bacillus stearothermophilus*.

The "flat sour" bacteria when present in food products will, in part, resist normal sterilizing processes and will, when left in the living state, grow and act upon the preserved food product and will cause the production of acid. Their action is destructive to the food products and will render them unsuitable for edible purposes.

The non-thermophilic sporogenic bacteria are also resistant to heat but do not grow at high temperatures, growing at an optimum temperature of 98° F. One of the principal representatives of this group of bacteria is *Clostridium botulinum*, a pathogenic bacteria causing a very serious type of food poisoning known as botulism. For the past ten years there has been on the average of eleven outbreaks per year of botulism food poisoning. This organism will withstand boiling temperatures for five and a half hours. Another representative of this group of sporogenic non-thermophilic bacteria is *Bacillus mesentericus*. This bacteria is present in wheat or rye flour in large numbers and causes a condition known as ropiness which makes the bread unsalable and unfit for use.

There are methods now in common but limited use which accomplish the destruction of sporogenic bacteria. These methods are costly and are not looked upon with favor by the industry.

One of these methods of common practice consists in placing, for example, ground flour into a sealed chamber and then treating it under pressure with certain gases for a predetermined period of time. There is danger in that these gases must be entirely removed from the flour or they may render the flour poisonous for edible purposes. Furthermore, this method of treatment is very expensive.

The primary object of this invention is to destroy sporogenic bacteria by surface treatment of the food products in cooked or otherwise treated conditions and particularly in raw state, e. g., the seeds in the case of cereal grains before they are ground into flour. We have discovered that the greater number of bacteria are present on the surface of the raw product such as the seed and that we are better able to destroy them while the seed or raw product is whole, i. e., in the case of the seed, is still unground. This discovery of the effectiveness of a surface treatment has enabled us to provide a reliable process for destroying sporogenic bacteria which is exceedingly simple, rapid and inexpensive.

A further object of the invention is to destroy the thermophilic and other bacteria with relatively non-poisonous chemicals. These chemicals consist of acids which are greatly ionized such as nitric acid and hydrochloric acid. Other mineral acids such as phosphoric and sulphuric as well as organic acids such as citric, lactic, acetic, levulinic, gluconic, propionic and hydroxy acetic will accomplish this purpose but some may require a slightly longer treating time than others.

An additional and equally important object of the invention is to destroy the sporogenic bacteria without chemically altering the product. For example, in the case of proteinous substances treated with nitric acid, the formation of xanthoproteic acid as indicated by yellowing of the solid protein is objectionable because it is detrimental to the protein. We have discovered by operating preferably at room temperatures of between about 70° to 80° F. or in some cases temperatures up to as high as 135° F. and with acid concentrations not greater than 10%, preferably about 8 to 10%, a simple momentary (about 1 to 2 minutes) contact of the acid with the surface of the product is sufficient to free it of sporogenic bacteria and without causing chemical or detrimental alteration of the protein.

An important consideration which we have observed is the concentration of the acid employed which appears to be critical. The following tabulation indicates representative tests conducted by use on unground soy beans and establish the fact that concentrations above about 10% are objectionable:

| Temperature | Percent nitric acid | Time of contact |
| --- | --- | --- |
| (1) 70° F | 20 | 1.5 minutes. |
| (2) 70° F | 10 | 1.5 minutes. |
| (3) 70° F | 20 | 1 minute. |
| (4) 100° F | 20 | 20 seconds. |
| (5) 110° F | 10 | 1.5 minutes. |
| (6) 176° F | 1 | Instantaneous. |
| (7) 135° F | 10 | 1.5 minutes. |

In tests, 1, 3, 4 and 6 there was definite chemical alteration and yellowing of the product as further evidenced by the presence of xanthoproteic acid. The tests as explained were conducted on a representative protein material such as soy bean.

In tests 2, 5 and 7, where the acid concentration was not greater than 10%, there was no chemical modification of the protein notwithstanding that temperatures as high as 135° F. were used.

In test 6 where the temperature was raised to 176° F., the protein was chemically modified instantaneously upon contact with acid, indicating that temperatures above 135° F. with only slight acid concentration produces an unfavorable result.

The process will be explained in connection with raw products of which a cereal grain such as wheat or a whole tuber, for example, the sugar beet are representative, but it is to be understood that other raw products as well as cooked and treated products where sporogenic bacteria may be present, are treated with equally satisfactory results.

The critical conditions to be observed are (1) surface treatment with (2) an acid of a concentration not greater than about 10% and preferably about 8 to 10% at (3) a temperature not greater than 135° F. and preferably room temperature of about 70 to 80° F., and (4) using a momentary period of contact of the acid with the raw product, namely between about 1 and 2 minutes.

The first step of our process consists of treating with an acid or combination of acids the unground cereal (as the whole seed) or the whole tuber (as the sugar beet) by immersion in this acid or by a spray or rain produced by this acid or in any other manner by which contact for the desired time and at the required temperature may be effected.

The second step of the treatment consists of removal of this acid or mixture of acids from the food. This may consist of immersion, rain, or spray or any other manner by which the acid is eliminated, preferably using water.

The third step of the process consists of passing the treated cereal or tuber through a conventional drying device to remove the moisture which was added during the treatment. This third step of our method of treatment is optional and may be omitted depending on the product. For instance, in the treatment of seeds which are immediately placed into cookers, the drying operation is not necessary. Also in the treatment of sugar beets and similar products, the drying operation may be omitted.

It is common practice today to add soy bean flour in various amounts to ground pork for the making of sausages. These sausages are packed in metal containers and are heat treated for preservation. They may then be sent to any of a number of hot climates where even temporary storage may provide ideal growing conditions for some types of these bacteria. When the containers are opened, it may be discovered that "flat sour" bacteria have rendered the sausages unfit for consumption. The present invention overcomes this difficulty by destroying all of the sporogenic bacteria present on the unground soy beans.

We are also able to effectively treat by our novel method other important cereals such as wheat and barley.

Wheat contains a great many sporogenic bacteria which are responsible for common bread trouble such as ropiness. Ropiness is caused by sporogenic bacteria which live through the normal baking temperatures and multiply sufficiently to cause a condition of ropiness before the bread is consumed.

Barley contains sporogenic bacteria and when the products of barley are used for food purposes they may be responsible for spoilage of that food.

Our ability to destroy by the use of the present process sporogenic bacteria present on sugar beets which are used for making of sugar is of considerable commercial significance. Beet sugar has not been heretofore readily acceptable by the food canning industry because of the presence of large numbers of sporogenic, namely, thermophilic bacteria. Cane sugar was preferred for the very reason that it contains fewer of these bacteria.

Moreover by the use of our method, it is possible to destroy sporogenic bacteria in beans used for canning. These beans when treated by our method will contain fewer or no sporogenic bacteria and can be preserved by heat treatment in containers by a much less severe heat treatment and shorter time than heretofore, thus preserving the quality of the canned product.

The method of killing sporogenic bacteria herein described is very economical in that the acids used for the treatment may be used over and over again and relatively inexpensive apparatus is necessary. There is very little destruction of the chemicals and prolonged use will weaken them only slightly. Periodic addition of small amounts of undiluted chemicals (acids) brings them to the original and necessary strength.

We have mentioned above a variety of representative raw food products and it is to be understood that numerous other of such products may be successfully treated in accordance with the invention and that the invention is not limited to raw products.

In referring herein to acids of a critical concentration we, of course, mean aqueous solutions of such commercial acids, by volume.

We claim:

1. The process of treating foods to destroy sporogenic bacteria comprising momentarily contacting the surface of the same with an acid solution of a concentration not greater than 10% and at a temperature not in excess of about 135° F., and removing residual acid from the food.

2. The process of treating foods to destroy sporogenic bacteria comprising momentarily contacting the surface of the same with an acid solution of a concentration not greater than 10% and at a temperature not in excess of about 135° F., and washing the acid solution from the treated product.

3. The process of treating foods to destroy sporogenic bacteria comprising momentarily contacting the surface of the same with a mineral acid solution of a concentration not greater than 10% and at a temperature not in excess of about 135° F., and removing residual acid from the food.

4. The process of treating foods to destroy sporogenic bacteria comprising momentarily contacting the surface of the same with an acid solution of a concentration not greater than 10% and at room temperature, and removing residual acid from the food.

5. The process of treating foods to destroy sporogenic bacteria comprising momentarily contacting the surface of the same with an acid solution of a concentration of about 8 to 10% and at room temperature, and removing residual acid from the food.

6. The process of treating foods to destroy sporogenic bacteria comprising momentarily contacting the surface of the same with an aqueous acid solution of a concentration not greater than about 10% and at a temperature not in excess of about 135° F., washing the acid solution from the treated product, and drying the treated product.

HENRY A. BEECHEM.
FREDERICK W. FABIAN.